US009065910B2

(12) United States Patent
Tasker

(10) Patent No.: US 9,065,910 B2
(45) Date of Patent: Jun. 23, 2015

(54) INTEGRATING TELEPHONY AND VOICE MAIL ROUTING

(75) Inventor: Michael Edric Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1715 days.

(21) Appl. No.: 12/210,849

(22) Filed: Sep. 15, 2008

(65) Prior Publication Data

US 2010/0067668 A1 Mar. 18, 2010

(51) Int. Cl.
*H04L 12/28* (2006.01)
*H04M 3/487* (2006.01)
*H04M 7/00* (2006.01)

(52) U.S. Cl.
CPC ............ *H04M 3/4878* (2013.01); *H04M 7/006* (2013.01); *H04M 2203/2027* (2013.01)

(58) Field of Classification Search
None
See application file for complete search history.

(56) References Cited

U.S. PATENT DOCUMENTS 7,957,513 B2 * 6/2011 Bishop et al. ............ 379/207.11
8,089,957 B2 * 1/2012 Bennett ......................... 370/356
2005/0094779 A1 5/2005 Kleinfelter et al.
2006/0136716 A1 6/2006 Cho et al.
2007/0121602 A1 5/2007 Sin et al.
2007/0206567 A1 9/2007 Elias et al.
2007/0211705 A1 * 9/2007 Sunstrum ...................... 370/356
2008/0031229 A1 2/2008 Michelson et al.

* cited by examiner

*Primary Examiner* — Gregory Sefcheck
*Assistant Examiner* — Daniel Mitchell
(74) *Attorney, Agent, or Firm* — Hickman Palermo Becker Bingham LLP

(57) ABSTRACT

A data processing system comprises call processing logic comprising a voice mail subsystem, or a call management subsystem configured to process voice-over-IP (VoIP) calls, or both a voice mail subsystem and a call management subsystem; service advertisement logic coupled to the call processing logic and operable to send one or more service advertisement messages by unicast to a remote peer data processing system that is also configured with compatible service advertisement logic, wherein the remote peer data processing system is located in a different LAN segment than the data processing system; and each service advertisement message comprises one or more network addresses associated with the call processing logic, and one or more data sets each comprising an identifier value, a first value that indicates that the identifier value is associated with a telephone extension, and a second value that indicates that the identifier value is associated with a voice mailbox.

26 Claims, 8 Drawing Sheets

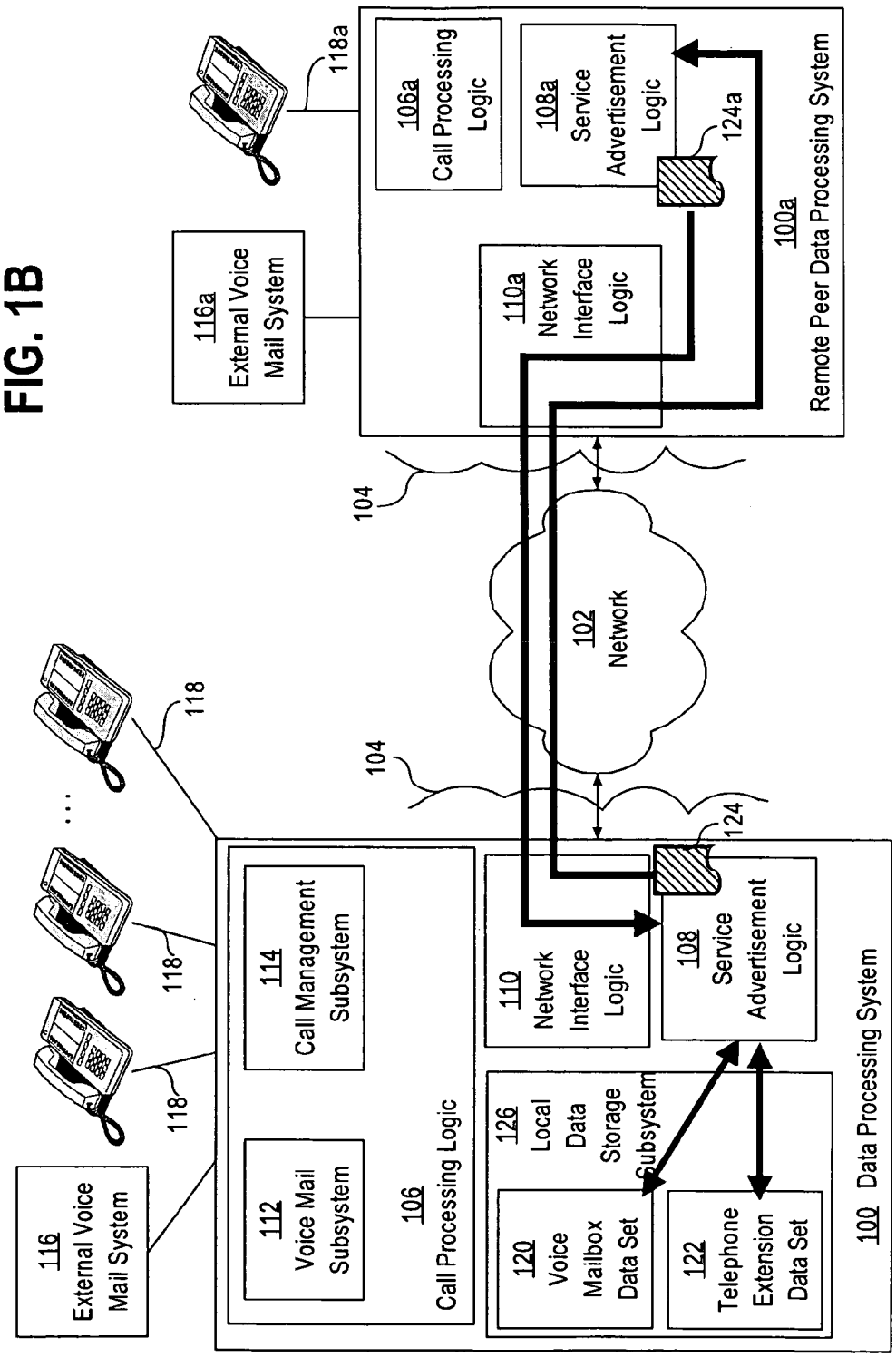

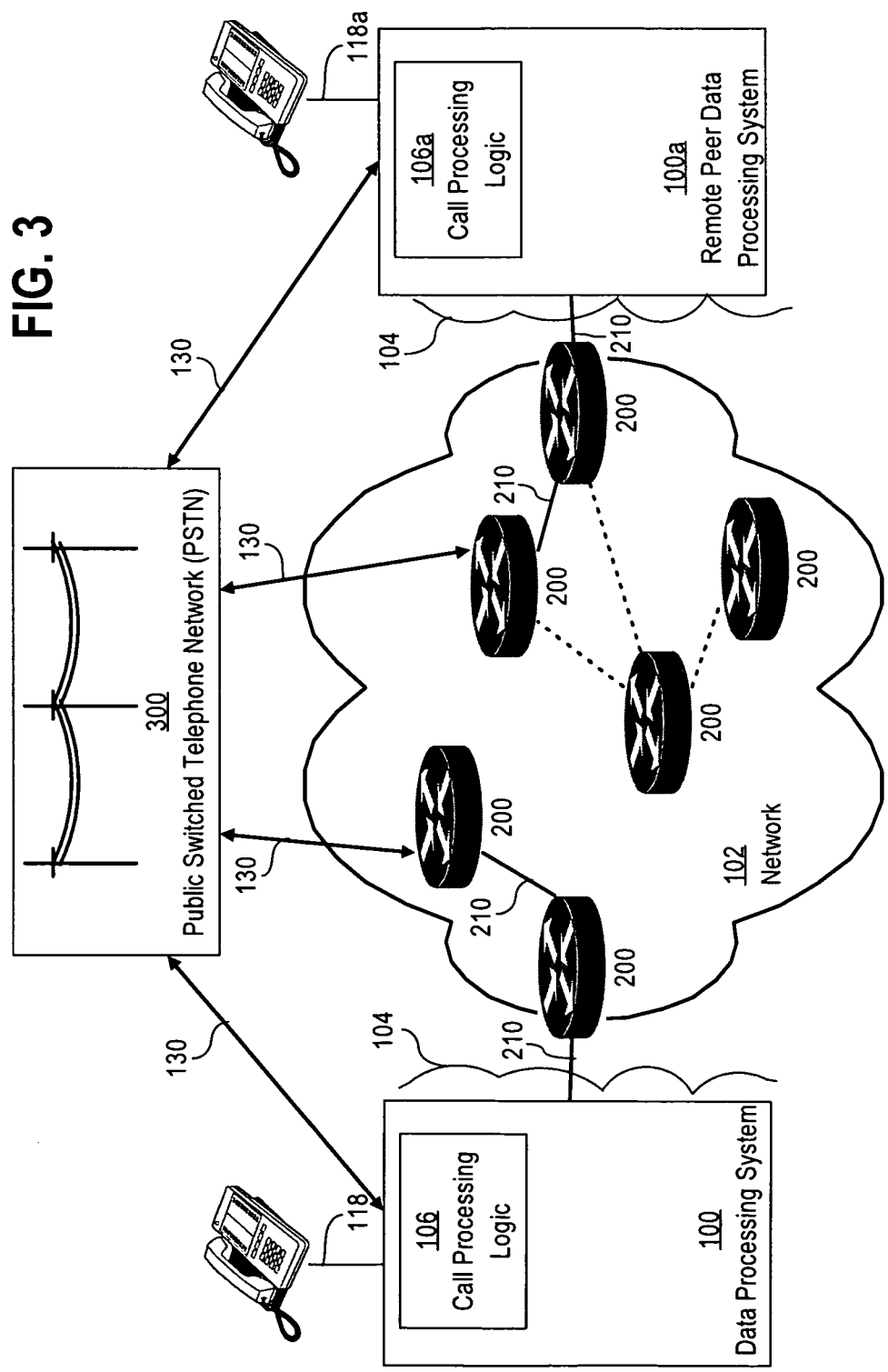

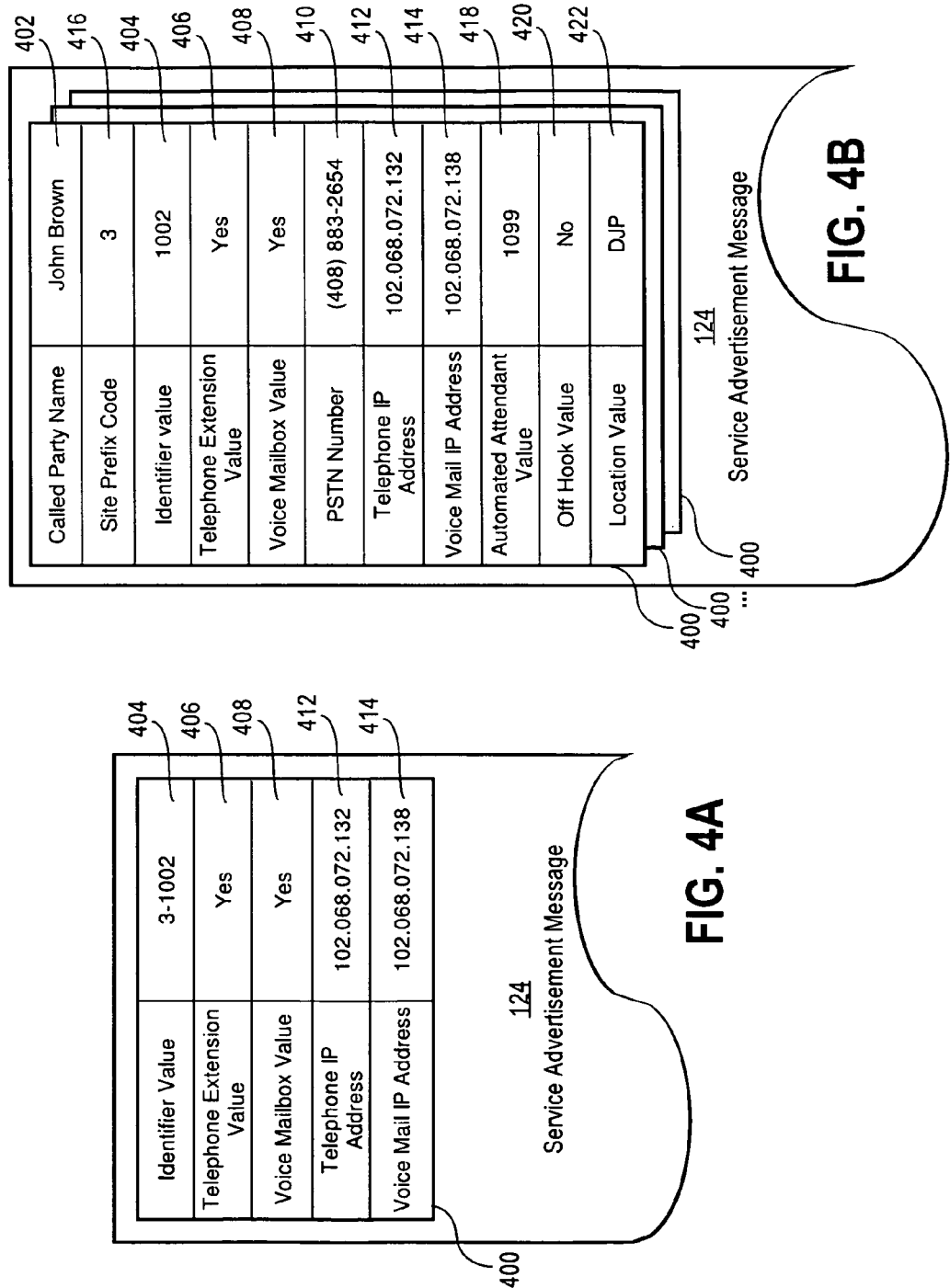

INTEGRATING TELEPHONY AND VOICE MAIL ROUTING

CROSS-REFERENCE TO RELATED APPLICATIONS

This application is related to U.S. patent application Ser. No. 11/863,218, filed on Sep. 27, 2007, the entire contents of which is hereby incorporated by reference as if fully set forth herein.

TECHNICAL FIELD

The present disclosure generally relates to network telephony.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Telecommunications solutions often require management of telephones and voice mailboxes distributed across a network. To process voice-over-IP (VoIP) calls, call processing systems often require the network address of the telephones and call processing systems associated with the calls. Often, telephones and call processing systems must be configured manually to connect to telephones and voice mailboxes. Even if locally attached telephones can be automatically configured, many call processing systems require manual configuration to access telephones and call processing systems connected across a wide area network (WAN) or through one or more internetworks. Manual configuration may also be required when the topology of a telecommunications system changes or when the network addresses of telephonic device and services are reassigned.

Additionally, even when the network address of a telephone extension is known, call processing systems often cannot determine if a voice mailbox is associated with the telephone extension. If a voice mailbox is associated with a known telephone extension, many call processing systems cannot identify the network address necessary to access the voice mailbox directly. As a result, many telecommunications systems cannot directly access the voice mailbox associated with a telephone extension. Instead, many systems must ring a telephone extension and rely on another system managing the telephone extension to transfer the call to an associated voice mailbox.

Service discovery approaches are often limited small network segments. Local broadcast mechanisms, such as Ethernet layer 2 for example, reach only systems in a single LAN segment. Among many systems, multicast over Ethernet layer 3 generates a large volume of network traffic and thus is inappropriate for service discovery. Other broadcast and multicast approaches generate a prodigious amount of network traffic and are inappropriate for service discovery among many systems over wide area networks and internetworks.

BRIEF DESCRIPTION OF THE DRAWINGS

In the drawings:

FIG. 1B illustrates data processing systems sending and receiving service advertisement messages;

FIG. 3 illustrates routing a call around a network outage;

FIG. 4A illustrates a service advertisement message;

FIG. 4B illustrates a service advertisement message;

DETAILED DESCRIPTION

Figure 1A:
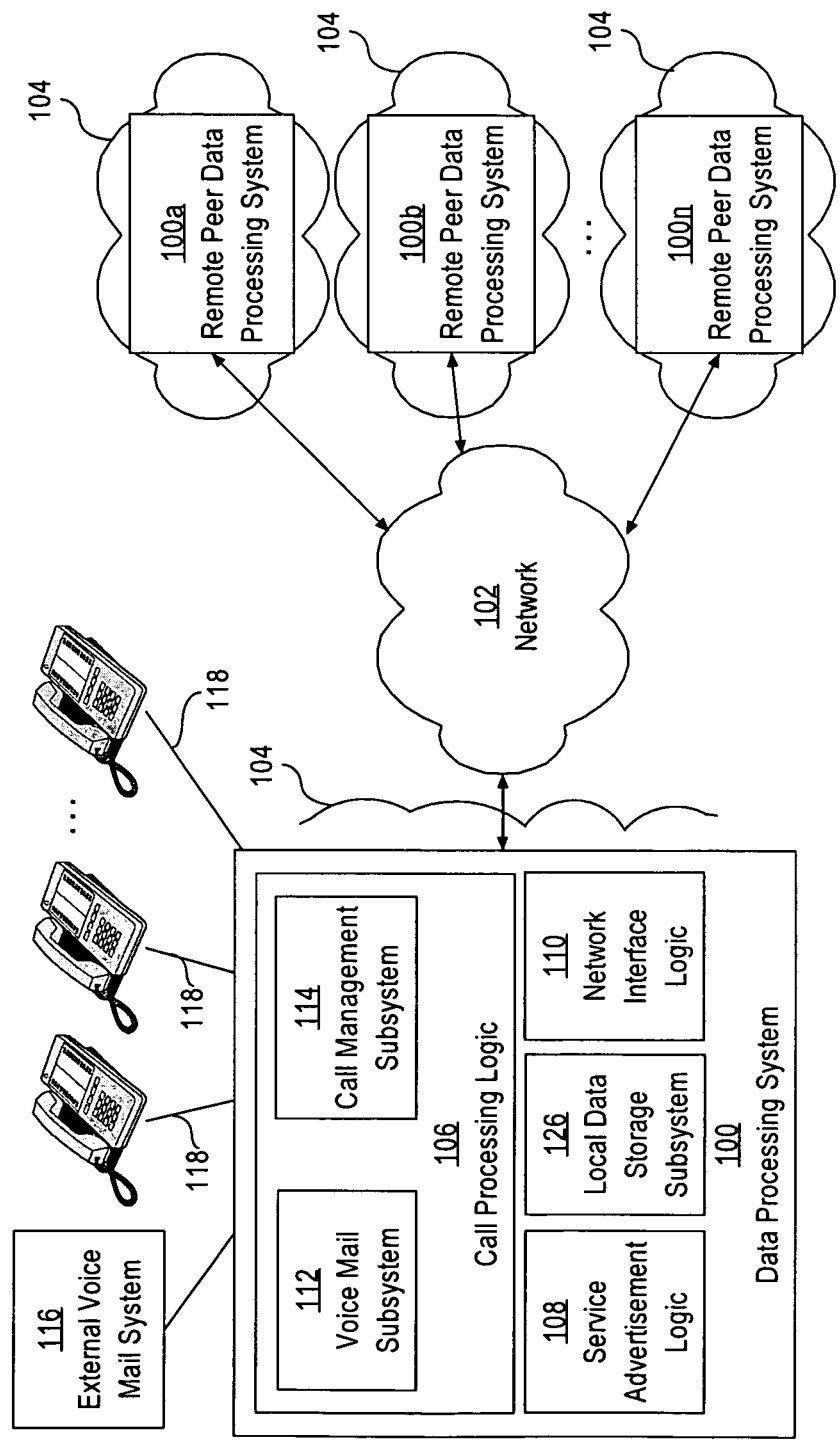
FIG. 1A illustrates data processing systems connected through a network.

Integrating telephony and voice mail routing is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Network Overview
    4.0 Service Advertisement Messages
    5.0 Implementation Mechanisms-Hardware Overview
    6.0 Extensions and Alternatives
    1.0 General Overview Integrating telephony and voice mail routing is described. In an embodiment, a data processing system comprises call processing logic comprising a voice mail subsystem, or a call management subsystem configured to process voice-over-IP (VoIP) calls, or both a voice mail subsystem and a call management subsystem; service advertisement logic coupled to the call processing logic and operable to send one or more service advertisement messages by unicast to a remote peer data processing system that is also configured with compatible service advertisement logic, and the remote peer data processing system is located in a different LAN segment than the data processing system; and each service advertisement message comprises one or more network addresses associated with the call processing logic, and one or more data sets each comprising an identifier value, a first value that indicates that the identifier value is associated with a telephone extension, and a second value that indicates that the identifier value is associated with a voice mailbox.

In an embodiment, the call processing logic is further operable to: receive one or more service advertisement messages from the remote peer data processing system; update data sets identifying local and remote telephone extensions and voice mailboxes in a local data storage subsystem based on the received one or more service advertisement messages; and based on the updated data sets, directly transfer a received call to a voice mailbox of the remote peer data processing system without transferring the received call to call management logic of the remote peer data processing system for forwarding to the voice mailbox on no-answer.

In an embodiment, the one or more service advertisement messages further comprise a site prefix code that identifies a call prefix for a site associated with the data processing system.

In an embodiment, one or more of the data sets of the one or more service advertisement messages further comprises a full PSTN number.

In an embodiment, one or more of the data sets of the one or more service advertisement messages further comprises a called party name.

In an embodiment, the data processing system comprises both a voice mail subsystem and a call management subsystem, and the network addresses comprise a first network address of the voice mail subsystem and a second network address of the call management subsystem.

In an embodiment, the service advertisement message further comprises an extension number of an automated attendant of the call processing logic.

In an embodiment, the one or more service advertisement messages further comprises a presence identifier that identifies any one or more of whether a telephone set of the associated identifier is on hook or off hook, or a location of a user associated with the identifier.

In an embodiment, the data processing system further comprises network interface logic configured to couple the data processing system to the remote peer data processing system over a wide area network or across one or more internetworks.

In other embodiments, the invention encompasses a computer-implemented method and a computer-readable medium configured to implement the foregoing functionality.

2.0 Structural and Functional Overview

FIG. 1A illustrates a data processing system 100 (or "system 100") coupled to remote peer data processing systems 100a-100n (or "remote systems 100a-100n") by a network 102, according to one embodiment. Although only system 100 is described and illustrated in detail, remote systems 100a-100n may optionally comprise the same elements described herein with respect to system 100.

System 100 and remote systems 100a-100n are coupled by a network 102, which comprises one or more networks or internetworks and may include, for example, local networks, the Internet or wide area networks (WANs). System 100 optionally comprises network interface logic 110 configured to couple the system 100 to the remote systems 100a-100n over a network 102.

System 100 and remote systems 100a-100n each may be located in a different one of local area network (LAN) segments 104, and the LAN segments are coupled to or form parts of the network 102. In FIG. 1A, systems 100 outside LAN segment 104 of system 100 are considered remote systems 100a-100n. For purposes of illustrating a clear example, each LAN segment 104 contains only one system 100 or remote system 100a-100n, however, a LAN segment 104 may contain multiple systems 100 or remote systems 100a-100n. Systems 100 and remote system 100a-100n also communicate with systems 100 within their respective LAN segments 104.

System 100 comprises call processing logic 106 that includes a voice mail subsystem 112, a call management subsystem 114, or both a voice mail subsystem 112 and a call management subsystem 114. Call processing logic 106 enables the system 100 to receive and process calls. Call management subsystem 114 is compatible with voice over Internet protocol (VoIP) and other calling systems and supports protocols including, but not limited to, session initiation protocol (SIP) and H.323. Processing a VoIP call includes performing one or more call management functions including, but not limited to, initiating, receiving, establishing, transferring, routing, forwarding, or otherwise manipulating a call. Similarly, voice mail subsystem 112 is configured to perform one or more voice mail functions, including processing, transferring, receiving, forwarding, routing, playing, recording, storing, or retrieving voice mail. To facilitate call processing, call processing logic 106 is configured to access data stored in a local data storage subsystem 126.

Optionally, the call management subsystem 114 receives calls from any of a variety of sources, such as a public switched telephone network (PSTN), a packet-based network, a telephone extension 118, or other sources. Telephone extensions 118 may comprise extension lines coupled to physical telephone sets or other telephonic devices. Telephone extensions 118 also include extension lines capable of coupling to physical telephone sets but not currently connected to a physical device. Each telephone extension 118 may be associated with an extension number, which includes digits that may be dialed to specify a telephone extension 118. The extension number, including one or more site prefix codes, may be part of a PSTN number that a party outside the telecommunications system can dial to reach the particular extension.

In an embodiment, extension numbers are unique within a segment of a telecommunications system, but may not be globally unique. For a particular site, for example, the extension number associated with each telephone extension 118 is different, so that an extension number corresponds to exactly one telephone extension 118 associated with that site. A particular extension number "101" may be unique among extension numbers at one site, but may not be unique among the combined set of extension numbers from multiple sites that are networked together.

A site prefix code may facilitate calling when identifier values 404 at multiple sites overlap. For example, a first site and second site both have a receptionist assigned to an extension with an identifier value 404 of "101." The first site is assigned a site prefix code of "1" and the second site is assigned a site prefix code of "2." A caller at the first site can call the local receptionist by dialing "101" or "1-101" and can call the receptionist at the second site by dialing "2-101."

In one embodiment, call processing logic 106 processes calls directed to and originating from a particular group of telephone extensions 118. A system 100 may process calls involving a set or range of extension numbers, for example. Alternatively, a system 100 may manage all or a subset of the telephone extensions 118 coupled to the LAN segment 104 in which the system 100 operates. Telephone extensions 118 may be coupled to the system 100 directly or may communicate indirectly through the LAN segment 104 in which the system 100 operates.

Voice mailboxes may be associated with an extension number, whether or not the extension number corresponds to a telephone extension 118. For example, after a telephone extension 118 rings a certain number of times, an incoming call may be transferred to an associated voice mailbox. Also, dialing an extension number may direct a call to a voice mailbox even though there is no physical telephone set or telephone extension 118 associated with the extension number. Thus, some or all voice mailboxes may be accessible directly, without requiring a call to first ring a telephone extension 118. A voice mailbox may also be shared among multiple extension numbers or telephone extensions 118.

System 100 manages voice mailboxes and telephone extensions 118 associated with system 100. The system 100 may also be coupled to an external voice mail system 116. Even if system 100 includes a voice mail subsystem 112, it is often desirable for the system 100 to also communicate with an external voice mail system 116, for example, to integrate with existing systems or to augment the capacity of a telecommunications solution.

System 100 also comprises service advertisement logic 108 configured to send service advertisement messages to remote systems 100*a*-100*n*. Service advertisement logic 108 is also configured to receive service advertisement messages from remote systems 100*a*-100*n*. As will be discussed in greater detail below, service advertisement messages enable system 100 to be configured to access services associated with remote systems 100*a*-100*n*. Similarly, service advertisement messages enable remote systems 100*a*-100*n* to be configured to access services associated with systems 100.

FIG. 1B illustrates sending and receiving service advertisement messages 124, 124*a* between system 100 and remote system 100*a*, according to one embodiment. FIG. 1B further illustrates updating a voice mailbox data set 120 and a telephone extension data set 122 based on the one or more service advertisement messages 124, 124*a*.

System 100 receives one or more service advertisement messages 124*a* from remote system 100*a*. Received service advertisement message 124*a* describes services, including telephone extensions 118*a* and voice mailbox, associated with remote system 100*a*. Services associated with remote system 100*a* include services provided by, managed by, accessible through or known to remote system 100*a*. Thus service advertisement message 124*a* may describe services known to remote system 100*a* even if the additional services are not directly provided by or managed by the remote system 100*a*.

Service advertisement message 124*a* identifies extension numbers associated with remote system 100*a* and services associated with each extension number. The service advertisement message 124*a* specifies that each extension number is associated with one or more of a telephone extension 118, a voice mailbox, an auto-attendant service, or other services. This information includes, for example, one or more network addresses, a value that indicates that an extension number is associated with a telephone extension 118, and a value that indicates that the extension number is associated with a voice mailbox. The service advertisement message 124*a* may include additional information associated with an extension number as described further herein.

Based on the one or more service advertisement messages 124*a* received, service advertisement logic 108 updates data sets in local data storage subsystem 126 that identify telephone extensions 118 and voice mailboxes. According to one embodiment, the data may be stored as a voice mailbox data set 120 and a telephone extension data set 122 within the local data storage subsystem 126.

According to one embodiment, updating the voice mailbox data set 120 and a telephone extension data set 122 configures the system 100 to access the services described in the received service advertisement message 124*a*. After storing network addresses corresponding to telephone extensions 118 and voice mailboxes, a system 100 can transfer calls to the telephone extensions 118 and voice mailboxes by sending data to the appropriate network addresses. Thus, the data in a service advertisement message 124*a* enables the system 100 to access services described in the service advertisement message without manual configuration. Because service advertisement messages 124, 124*a* travel over a network 102, automatic configuration occurs even though the system 100 and remote system 100*a* operate in different LAN segments 104.

System 100 is also configured to send one or more service advertisement messages 124 to remote system 100*a* over network 102. The one or more service advertisement messages 124 describe services associated with the system 100, as described above with respect to service advertisement messages 124*a* sent by a remote system 100*a*. Remote system 100*a* includes service advertisement logic 108*a* compatible with the service advertisement logic 108 of system 100, enabling remote system 100*a* to receive and process the one or more service advertisement messages 124 sent by system 100.

System 100 is also configured to send and receive service advertisement messages 124, 124*a* to update information stored by system 100 and remote systems 100*a*. When a new telephone extension 118 is coupled to system 100, system 100 sends a service advertisement message 124 with the new extension number and network addresses associated with the new telephone extension 118 to remote systems 100*a*. Similarly, when network addresses change for a telephone extension 118*a* associated with a remote system 100*a*, the remote system 100*a* sends a service advertisement message 124*a* to system 100 indicating the change in network addresses.

Figure 1C:
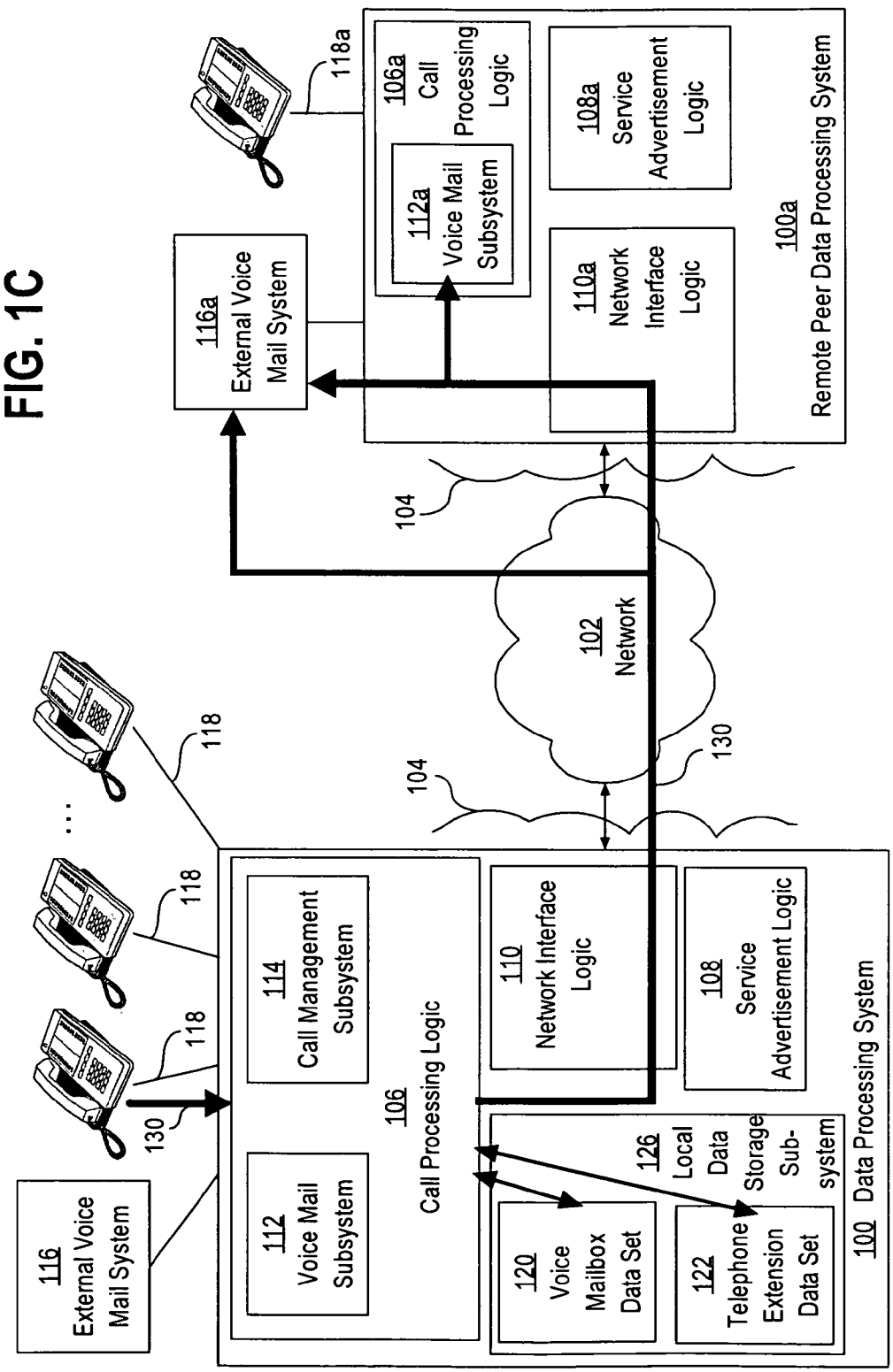
FIG. 1C illustrates a data processing system routing a call.

FIG. 1C illustrates an example of call processing based on data from one or more service advertisement messages 124, 124*a*. Specifically, FIG. 1C illustrates directly transferring a call to a voice mailbox associated with a remote system 100*a* based on an updated voice mailbox data set 120 and updated telephone extension data set 122.

First, system 100 receives one or more service advertisement messages 124, 124*a* from system 100*a*. Next, system 100 updates locally-stored data sets identifying local and remote telephone extensions and voice mailboxes based on the more or more service advertisement messages 124, 124*a*.

Call processing logic 106 then receives a call 130. The call 130 may be a VoIP call, a voicemail message, a PSTN call, videoconference call, or other call. As illustrated in FIG. 1C, the call 130 is received from a telephone extension 118 and is intended for a telephone extension 118*a* or a voice mailbox associated with a remote system 100*a*. For example, a caller initiates a call 130 by dialing, from a telephone extension 118 associated with system 100, an extension number associated with a telephone extension 118*a* coupled to remote system 100*a*.

System 100 processes the call 130 based on one or more locally-stored data sets. According to one embodiment, the one or more locally-stored data sets have been updated based on one or more service advertisement messages 124, 124*a* received by system 100*a*. Call processing logic 106, which may include a call management subsystem 114, accesses data stored in the voice mailbox data set 120 or the telephone extension data set 122.

For example, the call processing logic 106 determines a destination network address based on locally-stored network addresses associated with a called extension number. The call 130 is then transferred to the destination network address. A telephone extension 118, 118*a* and voice mailbox associated with a particular extension number may each be accessible at separate network addresses. Network addresses corresponding with telephone extensions 118, 118*a* and voice mailboxes are stored in a voice mailbox data set 120 and telephone extension data set 122.

As illustrated in FIG. 1C, a call 130 can be transferred directly to a voice mailbox associated with a called extension number. To facilitate the transfer, the call processing logic 106 accesses a voice mailbox data set 120 to determine the network address of a voice mailbox associated with the called extension number. The call is then transferred directly to the network address for the voice mailbox. Network interface logic 110, 110*a* may facilitate routing of the call 130 across the network.

Because the locally-stored data sets include a network address for the voice mailbox of the called extension number, the system 100 transfers a call 130 directly to a voice mailbox of the remote system 100a without transferring the received call 130 to call management logic 106a of the remote system 100a. The call 130 is transferred directly to a voice mailbox without using any logic in the remote system 100a for forwarding a call 130 to the voice mailbox based on a "no-answer" or direct-to-voice-mail setting.

Transferring a call 130 directly to a voice mailbox may be desirable in a variety of situations. For example, a caller may desire to send a recipient a voice message without ringing the recipient's telephone. The caller may be aware that the recipient is in a meeting and that the recipient desires not to be disturbed. Similarly, a system 100 coupled to the caller's telephone extension 118 may have access to information indicating that the recipient is in a meeting or otherwise unavailable, and based on that information, the system 100 may automatically transfer a call 130 to the recipient's voice mailbox.

Furthermore, since the transfer is performed by a system 100 coupled to the caller's telephone extension 118, the transfer does not depend on the capabilities or configuration of the recipient's voice mail system. Thus, no-answer functionality is achieved even if a remote system 100a managing the recipient's telephone extension 118a is improperly configured or if the remote system 100a does not support no-answer functionality. Furthermore, because the system 100 managing the caller's telephone extension 118 directly transfers the call 130 to the correct voice mailbox, minimal demands, if any, are placed on the remote system 100a managing the recipient's voice mailbox.

In addition to determining a network address based on the updated voice mailbox data set 120, call processing logic 106 may determine a PSTN number or other information to process a call 130. Similarly, data in the updated telephone extension data set 122 allows call processing logic 106 to directly route calls 130 to telephone extensions 118 coupled to remote systems 100a and other network addresses.

3.0 Network Overview

Figure 2:
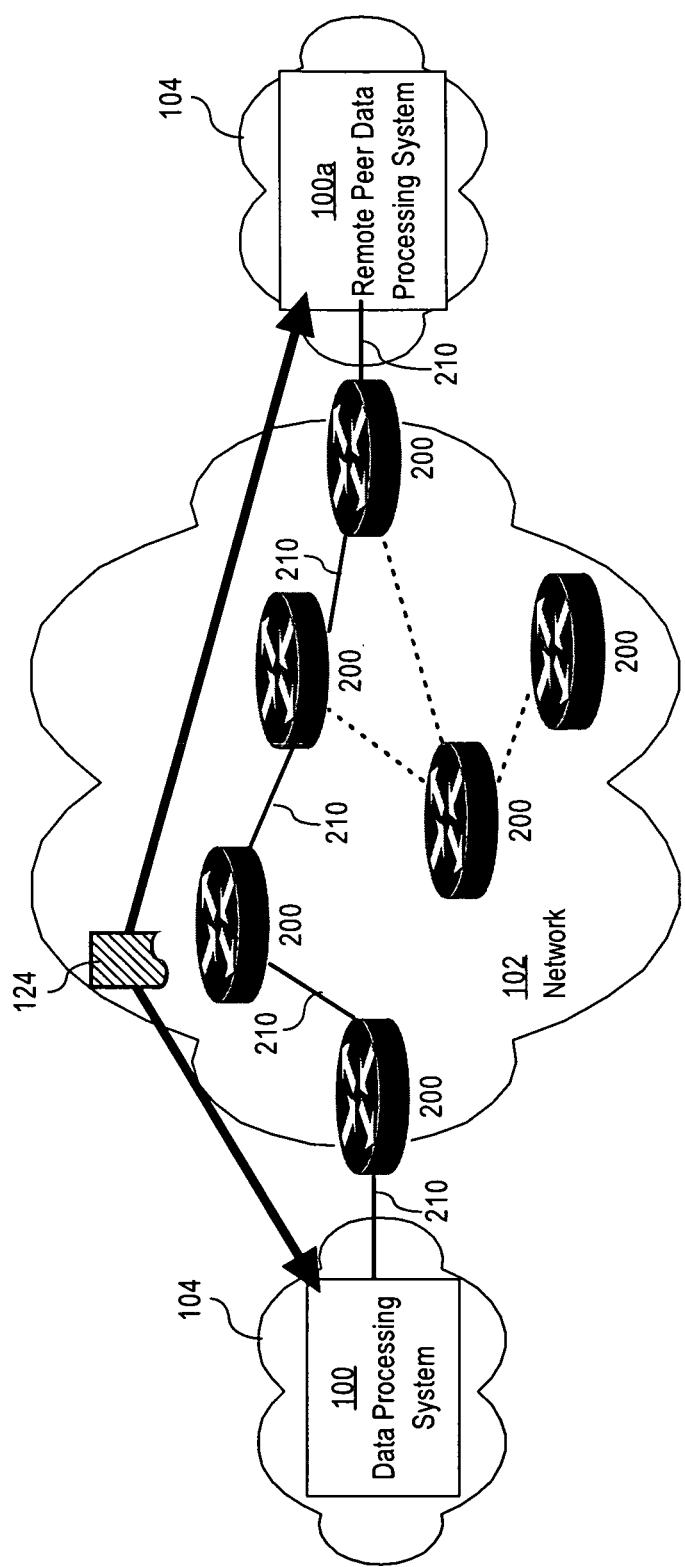
FIG. 2 illustrates a network topology for transmitting service advertisement messages.

FIG. 2 illustrates a network 102 for transmitting service advertisement messages 124 between a system 100 and a remote system 100a.

According to one embodiment, a system 100 sends and receives service advertisement messages 124 by unicast over a network 102. The system 100 does not rely on broadcast or multicast to send or receive service advertisement messages 124.

As illustrated, a service advertisement message 124 is transmitted over a series of point-to-point links 210 between nodes 200 in a network 102. A node 200 is a network infrastructure element including a system 100, remote system 100a, router, switch, hub, or gateway configured to transmit packets or other messages. Nodes 200 form links 210 and transmit service advertisement messages 124 according to the service advertisement framework (SAF) described in detail in U.S. patent application Ser. No. 11/863,218, filed on Sep. 27, 2007. The service advertisement messages 124 described herein may include, but are not limited to, service publication messages and service update messages as described in the aforementioned application.

Each node 200 communicates with its nearest neighbor node 200. The links 210 between them form a full mesh or partial mesh between the nodes 200 even if some of the links 210 are not currently active. A service advertisement message 124 travels over a path comprising individual links between nodes 200, but the path is not necessarily static. As nodes 200 become available or unavailable, the path between a system 100 and a remote system 100a may change. Because the nodes 200 are linked in a full mesh or partial mesh, as one link becomes unavailable, to the extent possible, one or more links 210 provide an alternate path for the service advertisement message 124.

Nodes 200 that comply with SAF may bypass nodes 200 that do not comply with SAF. SAF-compliant nodes 200 may direct non-SAF-compliant nodes 200 to forward service advertisement messages 124 in a particular manner to ensure that the path of the service advertisement messages 124 is not disrupted. For example, a SAF-compliant node 200 may direct a non-SAF-compliant node 200 to allow service advertisement messages 124 to pass through the non-SAF-compliant node 200 without altering the service advertisement messages 124.

According to one embodiment, service advertisement messages 124 may be sent only when needed to advertise new services or update data sets of remote systems 100a. Service advertisement messages 124 are not required to be sent or repeated at a certain time interval, for example. By not repeatedly sending service advertisement messages 124 when data sets have not changed, traffic over the network 102 is kept low and processing requirements for nodes 200 and systems 100 are lessened. For example, service advertisements may be sent only when a new system 100 is added or when the data in prior service advertisement messages 124 must be updated. According to one embodiment, each system 100 detects changes to services associated with the system 100 and determines when additional service advertisement messages 124 should be sent to remote systems 100a.

After a system 100 is first added to a network, the system 100 sends one or more service advertisement messages 124 to advertise services associated with the system 100. Associated services include services provided, managed, or identified by the system 100. Also, in response to the addition of the new system 100, remote systems 100a send one or more service advertisement messages 124 to the new system 100. Additionally or alternatively, nodes 200 that are compatible with service advertisement logic 106 compile data from service advertisement messages 124 and forward the compiled data to the new system 100, making it unnecessary for every remote system 100a to resend one or more service advertisement messages 124 each time a new system 100 is added. Service advertisement messages 124 are also sent by systems 100 and remote systems 124 to update previously disseminated information. A node 200 that includes a router for packet-based may integrate compiled network address data with routing tables for packet routing.

Service advertisement messages 124 further reduce traffic over a network 102 by integrating data about telephone extensions 118 and voice mailboxes in a single service advertisement message 124. As will be discussed in greater detail herein, each service advertisement message 124 contains one or more data sets. Each data set may describe routing information, including network addresses, for both a telephone extension 118 and a voice mailbox associated with an identifier value. In one embodiment, the identifier value is an extension number. By including information about both a telephone extension 118 and voice mailbox associated with an identifier value in a single service advertisement message 124, the information is circulated among nodes 200, systems 100, and remote systems 100a in fewer messages than would be necessary to describe a telephone extension 118 and a voice mailbox in separate messages.

FIG. 3 illustrates routing calls from a system 100 to a remote system 100a over both a network 102 and a public switched telephone network 300 (hereafter "PSTN 300"), according to one embodiment.

Generally, calls 130 are routed over network 102. When many network links 210 are broken and no additional links 210 are available to provide alternate routing, sections of a network 102 may become isolated from each other. To maintain communication during network outages, a system 100, remote system 100a, and nodes 200 may transfer calls over a PSTN 300 for all or part of the path of a call 130. The system 100, remote system 100a, and nodes 200 therefore integrate routing over a network 102 and a PSTN 300 when necessary.

According to one embodiment, one or more nodes 200, systems 100, or remote systems 100a are configured to detect when the last link between nodes 200 is broken. When routing through other nodes 200 is impossible, one or more nodes 200, systems 100, or remote systems 100a are configured to notify a nearest neighbor node 200 that previously advertised paths are no longer available. The notification propagates to nodes 200 that can access a PSTN 300, and as a result, calls 130 are routed around broken links over a PSTN 300.

4.0 Service Advertisement Messages

FIG. 4A illustrates an example of a service advertisement message 124, according to one embodiment.

Aggregating values associated with a single extension number in a single service advertisement message 124 reduces the bandwidth and processing requirements for systems 100 and enables greater functionality across multiple LAN segments 104.

A service advertisement message 124 includes at least one data set 400. According to one embodiment, values in data sets 400 do not include information that changes frequently. Instead, data sets 400 include semi-static information and references to sources where frequently changing information may be accessed. References to sources of information include network addresses and other values that indicate a source of information. For example, a reference may include a network address for a server providing real-time information. The network address of the server does not change frequently, but the information provided by the server changes in real-time. By including references information sources in data sets 400, changes to the values in the data sets 400 are less frequent than including the information itself. As a result, service advertisement messages 124 are sent only occasionally to provide updated values to systems 100 and minimal network bandwidth is consumed.

The values in a data set 400 are associated with an identifier value 404. In one embodiment, the identifier value 404 is an extension number associated with a telephone extension 118, or a voice mailbox, or both a telephone extension 118 and a voice mailbox.

A data set 400 comprises an identifier value 404, a telephone extension value 406, a voice mailbox value 408, and one or more network addresses, for example, a telephone IP address 412 or a voice mail IP address 414.

The identifier value 404 indicates the subject with which the values in the data set 400 are associated. According to one embodiment, an identifier value 404 specifies an extension number. The identifier value 404 may comprise, for example, digits that may be dialed to call a telephone extension 118 associated with the data set 400.

According to another embodiment, the identifier value 404 additionally or alternatively specifies a person, business, entity, service, or location associated with an extension number. The association of an identifier value 404 with a subject may be explicitly stated in a data set 400 or may be an indirect association based on the values in the data set 400. Thus the identifier value 404 enables the data set 400 to serve as a profile or directory entry for one or more subjects associated with the telephone extension.

For example, the subject associated with an identifier value 404 comprising a person's extension number could be the person associated with the extension number. Similarly, a business could be the subject associated with an identifier value 404 that comprises the extension number of the business's main reception desk. The data sets 400 in a service advertisement message 124 can thus provide enhanced information about an associated subject beyond simply facilitating routing to telephone extensions 118 and voice mailboxes.

Referring again to the values illustrated in FIG. 4A, the telephone extension value 406 indicates whether the identifier value 404 is associated with a telephone extension 118. According to one embodiment, the identifier value 404 comprises an extension number, and thus the telephone extension value 406 indicates whether the identifier value 404 represents a telephone extension 118. The telephone extension value 406 may be a Boolean value, a flag, a number code, or other value that indicates that a telephone extension 118 is associated with the identifier value 404.

The voice mailbox value 408 indicates whether the identifier value 404 is associated with a voice mailbox. According to one embodiment, the identifier value 404 comprises an extension number, and thus the voice mailbox value 408 indicates whether a voice mailbox is associated with the extension number of the identifier value 404. A voice mailbox associated with an identifier value 404 may be provided or managed by a voice mail subsystem 112 in the call processing logic 106 of a system 100 or may be provided or managed by an external voice mail system 116. The voice mailbox value 408 may be a Boolean value, a flag, a number code, or other value that indicates that a voice mailbox is associated with the identifier value 404.

The data set 400 also comprises one or more network addresses associated with the call processing logic 106 of a system 100. For example, the one or more network addresses comprise at least one of a telephone IP address 412 or voice mail IP address 414. If a telephone extension 118 is associated with the identifier value 404, the telephone IP address 412 indicates a network address assigned to that telephone extension 118. If a voice mailbox is associated with the identifier value 404, the voice mail IP address 414 indicates a network address assigned to the voice mailbox. The telephone IP address 412 or voice mail IP address 414 may represent a network address within the same LAN segment 104 as the system 100 sending the service advertisement message 124. Alternatively, one or more telephone IP addresses 412 or voice mail IP addresses 414 may represent a network address outside the LAN segment 104 of the system 100.

The network addresses provided in a data set 400 are not required to be the IP addresses perceived by a physical telephone set or voice mail device, as long as the network addresses direct a call 130 to the appropriate telephone extension 118 or voice mailbox. For example, a node 200 or system 100 may perform network address translation (NAT) on one or more network addresses. A node 200 or system 100 may assign one network address to a physical device within a LAN segment 104 while the device is represented by a second network address when viewed from outside the LAN segment 104.

In one embodiment, an external voice mail system 116 or voice mail subsystem 112 does not assign a separate network address to each voice mailbox. As a result, multiple extensions, and thus multiple data sets 400, may share the same voice mail IP address 414. For example, the network address may direct a call to a gateway. Nevertheless, when necessary, a system 100 uses appropriate protocols to identify an appropriate voice mailbox using the identifier value 404, an associated extension number, or other information provided in a data set 400.

When values in a data set 400 change after a service advertisement message 124 has already been sent, the values in data sets 400 may be updated in subsequent service advertisement messages 124. For example, the telephone IP address 412 associated with an identifier value 404 changes after a first service advertisement message 124 was sent to a remote system 100a. In response to the change, system 100 then sends a second service advertisement message 124 to the remote system 100a including a data set 400 with an updated telephone IP address 412. The data set 400 in the updated service advertisement message 124 may include fewer values or fewer data sets 400 than the first service advertisement message 124. In the previous example, the data set 400 in the updated service advertisement message 124 may include only the updated telephone IP address 412 and the identifier value 404 with which the updated telephone IP address 412 is associated.

FIG. 4B illustrates another example of the contents of a service advertisement message 124, according to one embodiment.

In addition to specifying routing information for a telephone extension 118 or voice mailbox, a data set 400 includes additional information about a subject. Although a data set 400 can clearly be associated with many types of subjects, for purposes of clarity, the following discussion will refer to the case in which the subject is a person.

As illustrated, a service advertisement message 124 may contain multiple data sets 400. According to one embodiment, each data set 400 corresponds to a single identifier value 404. Additionally, data sets 400 may be aggregated from other service advertisement messages 124 and forwarded to systems 100 and nodes 200 that have not yet received the data sets 400.

In addition to the values illustrated in FIG. 4A, the embodiment of FIG. 4B includes at least one of a called party name 402, a site prefix code 416, a PSTN number 410, an automated attendant value 418, an off hook value 420, and a location value 422.

The called party name 402 comprises an identifier including, but not limited to, the name of a person or subject associated with the identifier value 404.

A site prefix code 416 includes one or more digits dialed with an identifier value 404 to call a person associated with the identifier value 404. According to one embodiment, the site prefix code 416 corresponds to a specific physical location, a logical partition of a network, or a particular system 100.

The PSTN number 410 specifies a full set of digits which, when dialed, reach the telephone extension 118 or voice mailbox associated with the identifier value 404.

The automated attendant value 418 specifies the identifier value 404 of an automated attendant system associated with the identifier value 404 of the data set 400. Alternatively, the automated attendant value 418 specifies a network address of an automated attendant system associated with the identifier value 404 of the data set 400.

The off hook value 420 specifies whether a telephone extension 118 is on hook or off hook. The off hook value 420 may be a Boolean value, a flag, a number code, or other value that indicates that a telephone extension 118 associated with the identifier value 404 is on hook or off hook. Alternatively, off hook value 420 specifies a source of data specifying whether the telephone extension 118 associated with the identifier value 404 is on hook or off hook. The source for on hook data may comprise one or more network addresses.

The location value 422 specifies a location associated with the identifier value 404. According to one embodiment, the location value 422 specifies the physical location where a extension set telephone 118 associated with the identifier value 404 is located. According to another embodiment, the location value 422 specifies the current location of a person associated with the identifier value 404. According to yet another embodiment, the location value 422 specifies a source of data specifying the current location of a person associated with the identifier value 404. The source for location data may comprise one or more network addresses.

Figure 4C:
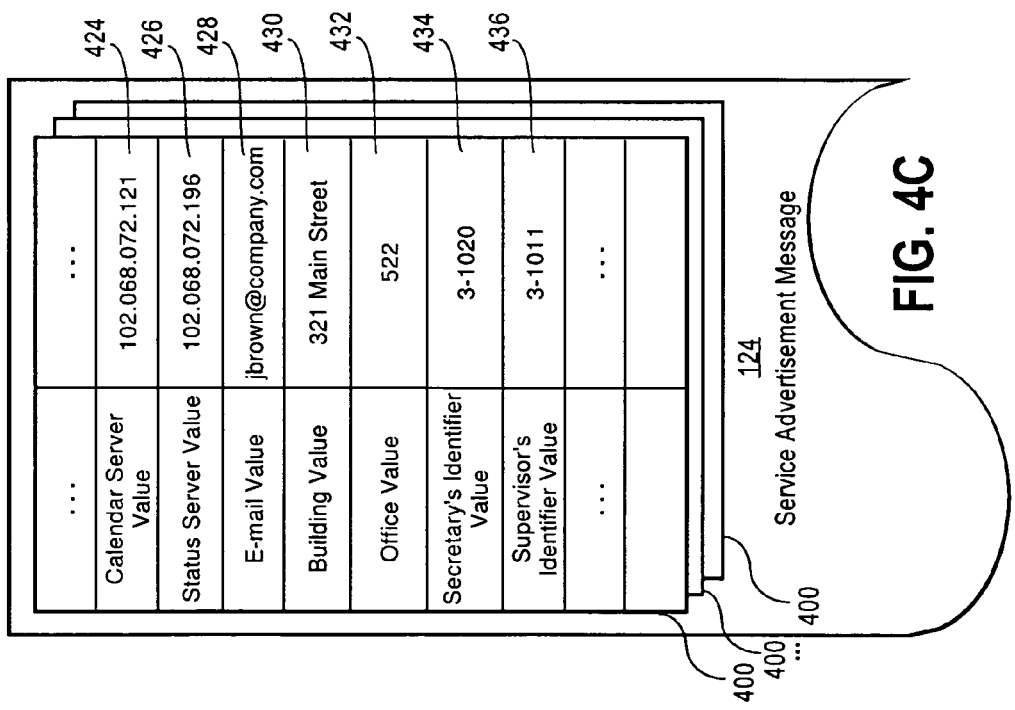
FIG. 4C illustrates a service advertisement message.

FIG. 4C illustrates yet another example of the contents of a service advertisement message 124, according to one embodiment. According to one embodiment, a service advertisement message 124 provides additional data about a subject associated with an extension. Specifically, the service advertisement message 124 includes at least one of a calendar server value 424, a status server value 426, an e-mail address 428, a building value 430, an office value 432, a secretary's identifier value 436, or a supervisor's identifier value 440.

The calendar server value 424 specifies a source of information about a calendar associated with the identifier value 404. According to one embodiment, the calendar server value 424 may specify a source of calendar information for a person associated with the identifier value 404. The calendar server value 424 may comprise one or more network addresses.

The status server value 426 specifies a source of information about a status associated with the identifier value 404. According to one embodiment, the status server value 426 may specify a source of information specifying status or presence information about a person associated with the identifier value 404 has a particular status, including, but not limited to, on or off the telephone, in a meeting, or out of the office. The status server value 426 may comprise one or more network addresses.

The e-mail address 428 specifies an e-mail address associated with the identifier value 404, for example the e-mail address of a person assigned to the identifier value 404. An instant messaging identification may be specified in a similar fashion.

The building value 430 specifies a building associated with the identifier value 404, for example the building in which a telephone extension 118 associated with the identifier value 404 is located or a building in which a person associated with the identifier value 404 works.

The office value 432 specifies an office associated with the identifier value 404, for example the office in which a telephone extension 118 associated with the identifier value 404 is located or an office in which a person associated with the identifier value 404 works.

The secretary's identifier value 436 specifies the identifier value 404 of the secretary of a person associated with the identifier value 404 of the data set 400.

The supervisor's identifier value 440 specifies the identifier value 404 of the supervisor of a person associated with the identifier value 404 of the data set 400.

The off hook value 420 and location value 422 of FIG. 4B are considered "presence identifiers." Presence identifiers indicate the current status of a subject associated with an identifier value 404 or provide access to current status information. Because the calendar server value 424 and status server value 426 provide access to current status information of a subject, the calendar server value 424 and status server value 426—and other references to periodically updated status information—are also considered presence identifiers.

Thus, the building value 430 and office value 432 may be implemented as presence identifiers by updating the values to reflect current information. Current information is not required to be real-time information, however.

Presence identifiers are updated in a variety of methods. According to one embodiment, presence identifiers are updated after a certain threshold is reached, e.g., after a certain amount of time has elapsed after a change in status or if a change reaches a predetermined level of significance. For example, the off hook value 420 may be updated according to any one of several updating policies, including updating periodically every 10 seconds, in response to a change in status, or after a change in status has persisted for 10 seconds.

In addition to the values illustrated in FIG. 4A, FIG. 4B, and FIG. 4C, data sets 400 in service advertisement messages 124 may provide additional information about a person or subject. The values in a data set 400 may enable additional functionality in a system 100 including, but not limited to, integration with directory services, calendars, e-mail systems. For example, a caller dials an extension associated with a recipient. The system 100 managing the call receives information about the recipient's schedule from a server specified in a calendar server value 424. The information from the calendar server indicates that the recipient is not in his office, but is instead at a different building. Rather than transfer the call to the telephone extension 118 in the recipient's office, the system 100 transfers the call to a telephone extension 118 in a location indicated in a location value 422 or indicated in the information from the calendar server.

5.0 Implementation Mechanisms—Hardware Overview

Figure 5:
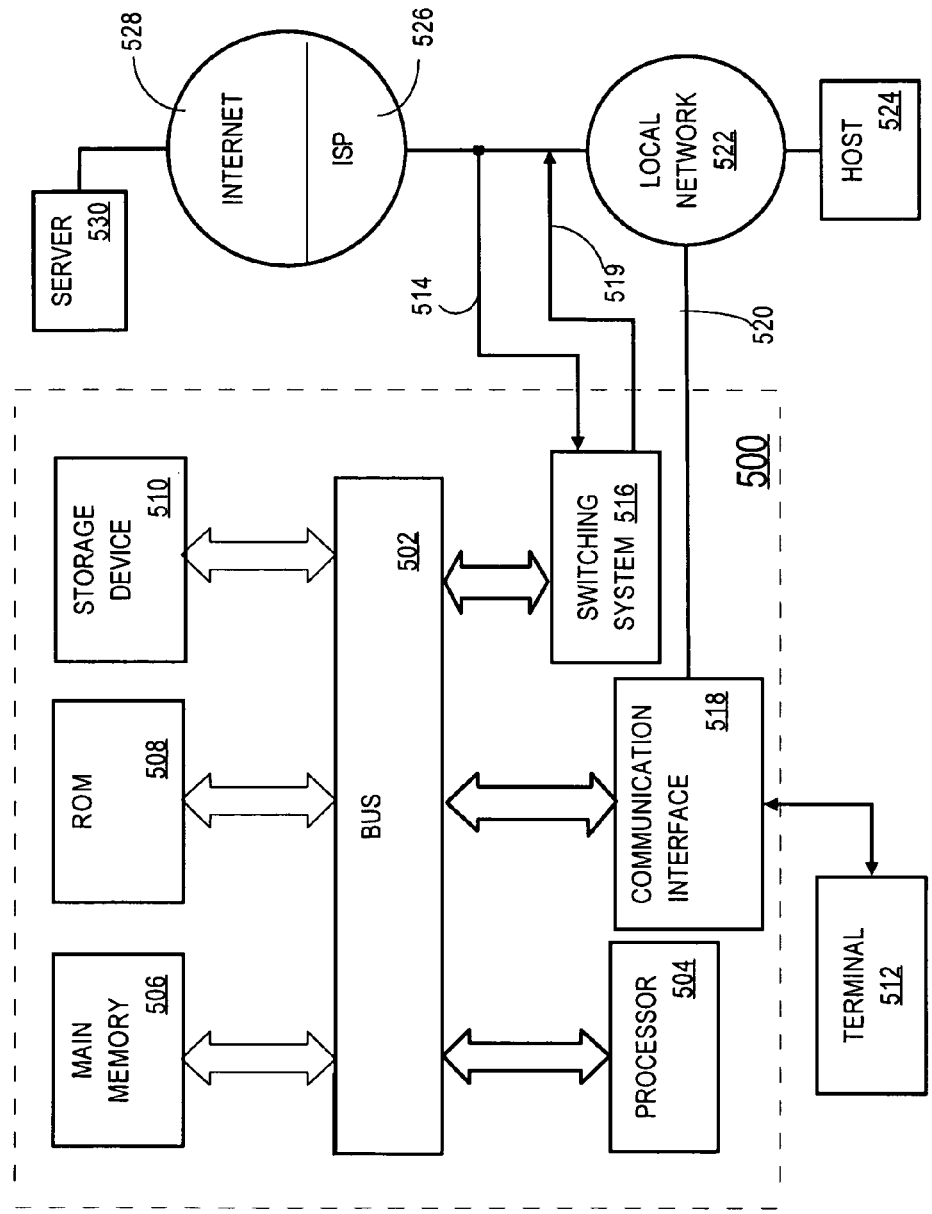
FIG. 5 illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for integrating telephony and voice mail routing. According to one embodiment of the invention, integrating telephony and voice mail routing is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile storage media, volatile storage media, and transmission media. Non-volatile storage media includes, for example, optical or magnetic disks, such as storage device 510. Volatile storage media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for integrating telephony and voice mail routing as described herein.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing system, comprising:
    first call processing logic, of a first data processing system, comprising both a first voice mail subsystem and a first call management subsystem configured to process voice-over-IP (VoIP) calls;
    first service advertisement logic coupled to the first call processing logic and operable to send one or more service advertisement messages by unicast to a second peer data processing system that comprises both a second voice mail subsystem and a second call management subsystem, and that is also configured with compatible second service advertisement logic, wherein the second peer data processing system is located in a different LAN segment than the data processing system;
    wherein each service advertisement message comprises one or more network addresses associated with the first call processing logic and associated with telephone extensions and voice mailboxes, and one or more data sets each comprising an identifier value, a first value that indicates that the identifier value is associated with a telephone extension, and a second value that indicates that the identifier value is associated with a voice mailbox;
    wherein the second value, provided by the first data processing system, is used by the second peer data processing system to directly transfer a call, without ringing, to the voice mailbox of the first data processing system without transferring the call to the first call management subsystem of the first data processing system for forwarding to the voice mailbox of the first data processing system.

2. The data processing system of claim 1, wherein the first call processing logic is further operable to:
    receive one or more service advertisement messages from the second peer data processing system;
    update data sets identifying local and remote telephone extensions and voice mailboxes in a local data storage subsystem based on the received one or more service advertisement messages; and
    based on the updated data sets, directly transfer a received call to the voice mailbox of the second peer data processing system without transferring the received call to the call management subsystem of the second peer data processing system for forwarding to the voice mailbox on no-answer.

3. The data processing system of claim 1, wherein the one or more service advertisement messages further comprises a site prefix code that identifies a call prefix for a site associated with the first data processing system.

4. The data processing system of claim 1, wherein one or more of the data sets of the one or more service advertisement messages further comprises a full PSTN number.

5. The data processing system of claim 1, wherein one or more of the data sets of the one or more service advertisement messages further comprise a called party name.

6. The data processing system of claim 1, wherein the one or more network addresses comprise a first network address of the first voice mail subsystem and a second network address of the first call management subsystem.

7. The data processing system of claim 1, wherein the one or more service advertisement messages further comprises an extension number of an automated attendant of the first call processing logic.

8. The data processing system of claim 1, wherein the one or more service advertisement messages further comprise a presence identifier that identifies any one or more of whether a telephone set of the identifier value is on hook or off hook, or a location of a user associated with the identifier value.

9. The data processing system of claim 1, further comprising network interface logic configured to couple the first data processing system to the second peer data processing system over a wide area network or across one or more internetworks.

10. A computer-implemented method, comprising:
    receiving one or more service advertisement messages at a first data processing system, by unicast from a second peer data processing system located in a different LAN segment than the first data processing system, the one or more service advertisement messages each comprising:

one or more network addresses associated with processing calls and associated with respective telephone extensions and voice mailboxes of the second peer data processing system, and one or more data sets each comprising an identifier value, a first value that indicates that the identifier value is associated with a telephone extension, and a second value that indicates that the identifier value is associated with a voice mailbox of the second peer data processing;

wherein the second value, provided by the second peer data processing system, is used by the first data processing system to directly transfer a call, without ringing, to a voice mailbox of the second peer data processing system without transferring the call to a call management subsystem of the second peer data processing system for forwarding to the voice mailbox of the second peer data processing system;

updating locally-stored data sets identifying local and remote telephone extensions and voice mailboxes based on the received one or more service advertisement messages;

receiving a voice mail communication and a VoIP call; and processing the voice mail communication and the VoIP call based on the one or more updated locally-stored data sets.

11. A method as claimed in claim 10, further comprising sending one or more service advertisement messages, by unicast from the first data processing system, to the second peer data processing system located in a different LAN segment than the first data processing system, the one or more service advertisement messages each comprising:

one or more network addresses associated with call processing logic of the second peer data processing system, and one or more datasets each comprising a first identifier value, a first value that indicates that the first identifier value is a first telephone extension, and a first second value that indicates that the first identifier value is the voice mailbox of the second peer data processing system.

12. A method as claimed in claim 11, wherein the one or more service advertisement messages further comprise an extension number of an automated attendant of the call processing logic.

13. A method as claimed in claim 10, further comprising:

based on the updated locally-stored data sets, directly transferring a received call to the voice mailbox of the second peer data processing system without transferring the received call to the call management subsystem of the second peer data processing system for forwarding to the voice mailbox of the second peer data processing system without ringing.

14. A method as claimed in claim 10, wherein the one or more service advertisement messages each further comprises a site prefix code that identifies a call prefix for a site associated with the first data processing system.

15. A method as claimed in claim 10, wherein one or more of the data sets of the one or more service advertisement messages further comprise a full PSTN number.

16. A method as claimed in claim 10, wherein one or more of the data sets of the one or more service advertisement messages further comprise a called party name.

17. A method as claimed in claim 10, wherein processing a voice mail communication and a VoIP call comprises both processing the voice mail communication and processing the VoIP call, and wherein the network addresses comprise a first network address for processing the voice mail communication and a second network address for processing the VoIP call.

18. A method as claimed in claim 10, wherein the one or more service advertisement messages further comprise a presence identifier that identifies any one or more of whether a telephone set of the identifier value is on hook or off hook, or a location of a user associated with the identifier value.

19. A method as claimed in claim 10, further comprising establishing a communication link with the second peer data processing system over a wide area network or across one or more internetworks.

20. A non-transitory computer-readable storage medium comprising one or more sequences of instructions which, when executed by one or more processors, cause the one or more processors to perform the steps of:

receiving one or more service advertisement messages at a first data processing system, by unicast from a second peer data processing system located in a different LAN segment than the first data processing system, the one or more service advertisement messages each comprising:

one or more network addresses associated with processing calls and associated with respective telephone extensions and voice mailboxes, and one or more datasets each comprising an identifier value, a first value that indicates that the identifier value is associated with a telephone extension, and a second value that indicates that the identifier value is associated with a voice mailbox of the f;

wherein the second value, provided by the second peer data processing system, is used by the first data processing system to directly transfer received calls, without ringing, to the voice mailbox of the second peer data processing system without transferring the received calls to a call management subsystem of the second peer data processing system for forwarding to the voice mailbox of the second peer data processing system;

updating locally-stored data sets identifying local and remote telephone extensions and voice mailboxes based on the received one or more service advertisement messages;

receiving a voice mail communication and a VoIP call; and processing the voice mail communication and the VoIP call based on the one or more updated locally-stored data sets.

21. A non-transitory computer-readable storage medium as claimed in claim 20, in which the one or more sequences of instructions, when executed by one or more processors, cause the one or more processors to perform the additional steps of:

sending one or more service advertisement messages, by unicast from the first data processing system, to the second peer data processing system located in a different LAN segment than the first data processing system, the one or more service advertisement messages each comprising:

one or more network addresses associated with call processing logic of the second peer data processing system, and one or more datasets each comprising a first identifier value, a first value that indicates that the first identifier value is a first telephone extension, and a first second value that indicates that the associated identifier value is the voice mailbox of the second peer data processing system.

22. A non-transitory computer-readable storage medium as claimed in claim 20, in which the one or more sequences of instructions, when executed by one or more processors, cause the one or more processors to perform the additional steps of:

updating data sets identifying local and second telephone extensions and voice mailboxes in a local data storage subsystem based on the received service advertisement messages; and based on the updated data sets, directly transferring a received call to the voice mailbox of the second peer data processing system without transferring the received call to the call management subsystem of the second peer data processing system for forwarding to the voice mailbox of the second peer data processing system without ringing.

23. A non-transitory computer-readable storage medium as claimed in claim 20, wherein the one or more service advertisement messages each further comprises a site prefix code that identifies a call prefix for a site associated with the first data processing system.

24. A non-transitory computer-readable storage medium as claimed in claim 20, wherein one or more of the data sets of the one or more service advertisement messages further comprise a full PSTN number.

25. An apparatus, comprising:

means for receiving one or more service advertisement messages at a first data processing system, by unicast from a second peer data processing system located in a different LAN segment than the first data processing system, the one or more service advertisement messages each comprising:

one or more network addresses associated with processing calls and associated with telephone extensions and voice mailboxes of the second peer data processing system, and one or more datasets each comprising an identifier value, a first value that indicates that the identifier value is associated with a telephone extension, and a second value that indicates that the identifier value is associated with a voice mailbox of the second peer data processing system;

wherein the second value, provided by the second peer data processing system, is used by the first data processing system to directly transfer a call, without ringing, to the voice mailbox of the second peer data processing system without transferring the call to a call management subsystem of the second peer data processing system for forwarding to the voice mailbox of the second peer data processing system;

means for updating locally-stored data sets identifying local and remote telephone extensions and voice mailboxes based on the received one or more service advertisement messages;

means for receiving a voice mail communication and a VoIP call; and means for processing the one of a voice mail communication and a VoIP call based on the one or more updated locally-stored data sets.

26. A data packet router, comprising:

voice-over-IP (VoIP) call processing logic comprising a voice mail subsystem and a call management subsystem configured to receive, process, transfer and route (VoIP) calls using any of H.323 protocol and SIP protocol;

service advertisement logic coupled to the call processing logic and operable to send one or more service advertisement messages by unicast to a second peer data processing system that is also configured with compatible service advertisement logic;

wherein each service advertisement message comprises: a first network address of the voice mail subsystem and associated with voice mailboxes; a second network address of the call management subsystem and associated with telephone extensions; one or more data sets of an identifier value, a first flag value which indicates that the identifier value is a telephone extension, and a second flag value which indicates that the identifier value is a voice mailbox; a site prefix code that identifies a call prefix for a site associated with the data processing system; an extension number of an automated attendant of the call processing logic; and a presence identifier that identifies any one or more of whether a telephone set of the identifier value is on hook or off hook, or a location of a user associated with the identifier value;

network interface logic configured to couple a data processing system to the second peer data processing system over a wide area network or across one or more internetworks;

wherein the call processing logic is further operable to:

receive one of the service advertisement messages from the second peer data processing system;

updating telephone extension data sets identifying local and remote telephone extensions and voice mailboxes in a local data storage subsystem based on the received one of the service advertisement messages;

based on the updated data sets, directly transferring a received call to a second voice mailbox of the second peer data processing system without transferring the received call to call management logic of the second peer data processing system for forwarding to the second voice mailbox on no-answer;

wherein the one or more of the data sets of the service advertisement message further comprises a full PSTN number and a called party name.

* * * * *